Patented May 3, 1927.

1,626,916

UNITED STATES PATENT OFFICE.

CHARLES E. BURKE, OF WILMINGTON, DELAWARE, ASSIGNOR TO E. I. DU PONT DE NEMOURS & COMPANY, OF WILMINGTON, DELAWARE, A CORPORATION OF DELAWARE.

STABILIZATION OF PLASTICS.

No Drawing. Application filed June 24, 1925. Serial No. 39,380.

This invention relates to the stabilization of plastics and comprises esters of phenylglycine as stabilizers and stabilized nitrocellulose plastics containing the same.

It has long been known that nitrocellulose products decompose to a perceptible extent even at ordinary temperatures and that the rate of decomposition increases rapidly with rise in temperature or with the accumulation of the products of decomposition. It is also known that, by adding to such nitrocellulose products substances which will combine with the products of nitrocellulose decomposition, such decomposition products are removed from the field of chemical reaction, the nitrocellulose material is rendered more stable and the life of the material is prolonged. Basic substances, such as calcium carbonate, have been used in this connection with varying results. Many other substances such as urea, anilin, diphenylamine, vaseline, etc., have been used and in many cases have been found to prolong the life of the nitrocellulose to a marked degree.

I have discovered that the esters of phenylglycine (phenyl derivative of aminoacetic acid) are excellent stabilizing materials and when incorporated with nitrocellulose products considerably lengthen the life of such material. These esters of phenylglycine may be readily and cheaply prepared, have a greater stabilizing action than the compounds now in use, and they also have the additional advantage that they are good colloiding agents for the nitrocellulose itself. This permits more intimate and uniform incorporation of the stabilizer with the nitrocellulose than is possible with other stabilizers which do not colloid with the nitrocellulose and results in a more complete removal of the products of decomposition.

Several methods are outlined in the literature for preparing these esters and any of these methods may be used for the preparation, providing care is taken to obtain a reasonably pure product. For example, the esters may be prepared by treating a sodium or potassium salt of phenylglycine with an alcohol corresponding to the particular ester desired, say for example, ethyl alcohol, adding thereto slightly more than sufficient concentrated sulfuric acid to completely react with the salt of phenylglycine, and thus regenerate the free phenylglycine. After refluxing for several hours, the product is drowned in water, neutralized with sodium carbonate and the ester which precipitates is filtered off and dried.

The following examples are given by way of illustration of the manner in which the ester may be used as a stabilizing agent, although we do not limit ourselves to the particular proportions given nor to the particular materials specified.

1. The ester of phenylglycine may be incorporated into a powder of the Cordite type as follows:—

| | Parts. |
|---|---|
| Nitrocellulose | 70 |
| Nitroglycerine | 30 |
| Ethyl ester of phenylglycine | 1 |

2. The ester may be incorporated into a smokeless powder as follows:—

| | Parts. |
|---|---|
| Nitrocellulose | 95 |
| Butyl ester of phenylglycine | 1 |

In examples such as those just described, the ingredients are mixed and the powder finished by the usual procedure. Powders so prepared have good ballistic properties and owing to the presence of the ester of phenylglycine, have been found to be more stable than the usual product.

The following examples are given as illustrative of the manner in which the ester stabilizer may be used in such nitrocellulose plastics as pyralin:

| | Parts. |
|---|---|
| 3. Nitrocellulose | 100 |
| Camphor | 60 |
| Phenyl ester of phenylglycine | 1 |
| 4. Nitrocellulose | 100 |
| Tricresylphosphate | 59.6 |
| Methyl ester of phenylglycine | 1 |

In these cases, also, the materials are mixed either in a mixing machine or on the rolls, or both, and the material finished according to the usual methods. The esters of phenylglycine readily colloid with the nitrocellulose and render the resulting product much more stable than the usual plastic.

If desirable, several of the esters of phenylglycine may be incorporated in a single nitrocellulose product. The amount of stabilizer used in the plastic may vary within comparatively wide limits, but it has been found preferable to use between one half per cent to five per cent of the ester in the mixture.

I claim:

1. A stabilized nitrocellulose composition containing an ester of phenylglycine.

2. A stabilized nitrocellulose composition containing an alkyl ester of phenylglycine.

3. A stabilized nitrocellulose composition containing ethyl ester of phenylglycine.

4. A nitrocellulose plastic composition containing an ester of phenylglycine as a stabilizer.

5. A stabilized nitrocellulose plastic containing a softener and an ester of phenylglycine.

6. A stabilized nitrocellulose plastic containing camphor and an ester of phenylglycine.

7. A nitrocellulose plastic composition containing between one half per cent and five per cent of an ester of the phenyl derivative of amino-acetic acid.

8. A nitrocellulose plastic composition containing les than five per cent of an ester of phenylglycine.

9. A nitrocellulose plastic composition containing less than five per cent of an ester phenylglycine.

In testimony whereof I affix my signature.

CHARLES E. BURKE.

---

Certificate of Correction.

Patent No. 1,626,916. Granted May 3, 1927, to

CHARLES E. BURKE.

It is hereby certified that error appears in the printed specification of the above-numbered patent requiring correction as follows: Page 2, line 28, claim 8, for the misspelled word "les" read *less;* same page, line 31, claim 9, strike out the words "less than five per cent of an ester", and insert instead *one per cent of ethyl ester;* and that the said Letters Patent should be read with these corrections therein that the same may conform to the record of the case in the Patent Office.

Signed and sealed this 7th day of June, A. D. 1927.

[L. S.]

M. J. MOORE,
*Acting Commissioner of Patents.*